L. W. FABER.
ERASER HOLDER.
APPLICATION FILED SEPT. 24, 1920.
1,373,062.
Patented Mar. 29, 1921.
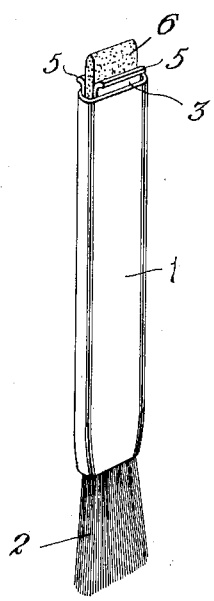
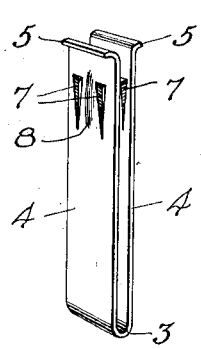
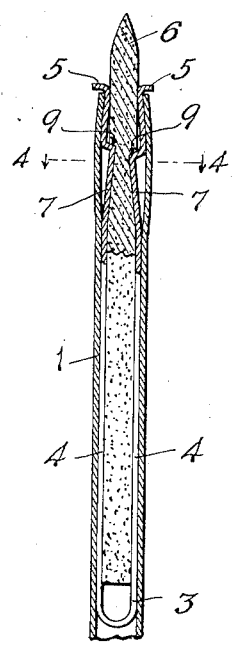
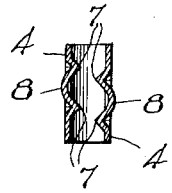
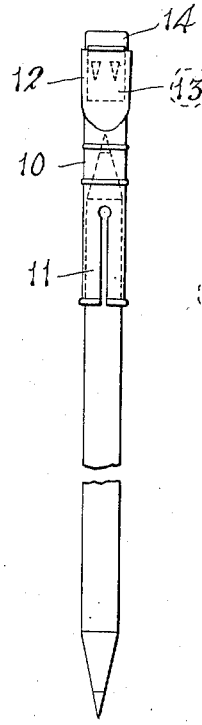
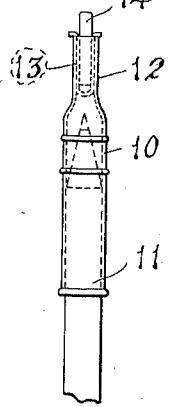
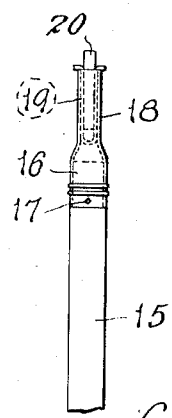
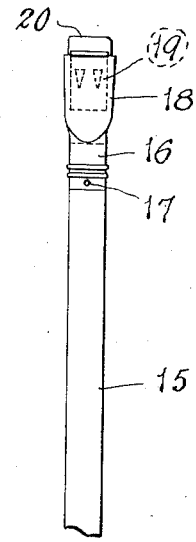
INVENTOR
Lothar W. Faber
BY
Everett H. Rook
ATTORNEYS.

UNITED STATES PATENT OFFICE.

LOTHAR W. FABER, OF NEW YORK, N. Y., ASSIGNOR TO EBERHARD FABER PENCIL COMPANY, A CORPORATION OF NEW YORK.

ERASER-HOLDER.

1,373,062.　　　　Specification of Letters Patent.　　Patented Mar. 29, 1921.

Application filed September 24, 1920. Serial No. 412,535.

*To all whom it may concern:*

Be it known that I, LOTHAR W. FABER, a citizen of the United States, and a resident of New York city, in the county of New York and State of New York, have invented new and useful Improvements in Eraser-Holders, of which the following is a specification.

This invention relates in general to eraser holders, and more particularly to that type of eraser holder in which a strip of erasive rubber or the like is carried by a clip or casing so as to be adjustable out of the clip as the erasive substance wears away, the clip or casing serving as a handle for operating the eraser.

The objects of the invention are to provide an eraser holder of the character described embodying novel features of construction whereby the erasive substance is securely held against slipping in the holder and is easily and quickly adjustable therein; to provide an eraser holding member having an open end to receive an eraser strip and having projections on the inner walls thereof to engage the eraser to hold the same against slipping into the said member and allowing the eraser to freely move outwardly into operative position; to provide an eraser holder comprising a clip to receive the eraser and a casing into which said clip is adapted to fit, the insertion of the clip into the casing tightly clamping the eraser in said clip and securely locking the clip in said casing to hold the clip against slipping out of the casing; to provide an eraser holder comprising a substantially U-shaped clip to receive the eraser between its arms, the inner sides of the arms of the clip being formed with projections to grip the eraser, and a casing to receive said clip, the walls of the casing frictionally engaging the arms of the clip and forcing them together to tightly clamp the eraser therebetween and the clip being locked in the casing by the forcing of those portions of the clip having the projections thereon into the casing; and to obtain other results and advantages as may be brought out by the following description.

Referring to the accompanying drawing, in which like numerals of reference indicate the same parts throughout the several views.

Figure 1 is a perspective view of an eraser holder embodying my invention;

Fig. 2 is a perspective view of the eraser holding clip removed from the casing;

Fig. 3 is an enlarged transverse vertical sectional view through the eraser holder;

Fig. 4 is a horizontal sectional view through the eraser holding clip taken on the line 4—4 of Fig. 3;

Fig. 5 is a front elevation of a modified form of my invention showing the same as applied to a casing adapted to be detachably secured to a pencil or the like;

Fig. 6 is a side elevation of the form of the invention shown in Fig. 5;

Fig. 7 is a view similar to Fig. 5 showing the eraser holder embodying my invention permanently applied to a pencil or the like, and Fig. 8 is a side elevation of the form of the invention illustrated in Fig. 7.

In the embodiment of my invention illustrated in Figs. 1–4 inclusive in the drawings, the numeral 1 designates a tubular casing of substantially rectangular cross-section, which carries at one end thereof a brush 2, the opposite end of the casing being open and adapted to slidably receive an eraser holding clip 3, the said casing 1 being preferably formed of sheet metal. The eraser holding clip 3 is substantially U-shaped, the outer extremities of the arms 4 thereof being bent at substantially right angles as at 5 to limit the insertion of the clip into the casing 1. The clip 3 is adapted to snugly receive between its arms 4 a strip 6 of erasive substance, such as rubber, and a plurality of projections 7 are formed in each of the arms 4 of the clip inwardly of the outer ends thereof to bite into the erasive strip 6 to securely hold the same within the clip 3. In the present instance these projections 7 are shown as formed by depressing or stamping the material of which the clip is formed inwardly, the said depressions having their deepest portions at the outer ends thereof and gradually decreasing in depth toward the inner end of the clip as more clearly shown in Fig. 3 of the drawing. The projections 7 are also preferably offset or staggered with relation to each other both transversely and longitudinally of the respective arms 4 as shown in Figs. 3 and 4 of the drawing, so that the projections will more securely grip the erasive strip 6, the tendency of the projections being to bend the strip 6 alternately in opposite directions. With reference to Figs. 2 and 4 it will be noted that the formation of the projections 7 as above described bulges the material of which the clip is formed outwardly between the depressions forming the projections 7 as at 8.

In applying the erasive strip 6 to the holder, the strip is first inserted into the clip 3 with one end thereof slightly projecting beyond the outer extremity of the clip, after which the clip is forced into the open end of the casing 1 as shown in Figs. 1 and 3. The projections 7 on the arms of the clip hold those portions of the arms 1 of the clip 3 adjacent the projections spaced from the sides of the erasive strip 6, and as the clip is forced into the casing the walls of the casing slightly expand over the said projections of the arms of the clip, as shown in Fig. 3, and after the projections have passed into the casing the outer end of the casing contracts against the outer extremities of the arms 4 of the clip so as to effectively lock the clip within the casing 1. Resistance of the walls of the casing 1 to yielding outwardly over the bulging portions of the clip 3 forces the projections 7 to bite into the sides of the erasive strip 6 and thereby firmly hold the erasive strip against slipping into or out of the clip 3, and this action of the casing on the arms 4 of the clip is enhanced by the bulged portions 8 on the arms 4 of the clip between the projections 7. After the projecting end of the erasive strip has been worn down to the end of the holder, the clip 3 can be pulled outwardly from the casing, the bent ends 5 of the clip serving as finger holds, and the erasive strip pulled longitudinally outwardly from the clip a sufficient distance, after which the clip can be forced back into the casing whereupon the erasive strip is securely clamped in the clip and the clip securely locked within the casing as above described. It will be noted that the inclined arrangement of the projections 7 renders easy the adjustment of the erasive strip 6 outwardly of the clip, there being substantially no resistance by the projections 7 to this adjustment. However, the outer ends 9 of the projections 7 being disposed at sharper angles with respect to the arms 4 of the clip, inward movement of the erasive strip is resisted thereby. Obviously the brush 2 can be utilized for brushing the particles of erasive substance and paper from the surface upon which the eraser is used, the casing 1 serving as a common handle for the operation of both the eraser 6 and the brush 2.

An eraser holder embodying my invention is also adapted for use with a conventional pencil or the like, and the holder may be either adapted to be detachably attached to a pencil or may be permanently applied thereto. In Figs. 5 and 6 the eraser holder is shown as comprising a cylindrical tube 10 which is analogous to the casing 1 above described, one end 11 of said tube being adapted to slip over a pencil, the other end of the tube being flattened as at 12 to receive the eraser holding clip 13 which carries the eraser 14. The construction and operation of the eraser holding clip 13 and the flattened end 12 of the tube 10 is substantially identical with the construction and operation of the eraser holder above described, the sizes of the respective parts being varied to suit the particular form in which the invention is to be embodied.

In Figs. 7 and 8 the eraser holder is shown as permanently applied to one end of a pencil 15, the holder comprising a cylindrical tube 16 having one end thereof permanently attached to the pencil by any suitable means such as the conventional indentations 17, the outer end of said tube being flattened at 18 to receive the eraser holding clip 19 and eraser 20. The construction and operation of this form of the invention is identical with the construction and operation of the form shown in Figs. 5 and 6, with the exception of the attachment of the tube or casing to the pencil.

While I have shown and described several embodiments of my invention, it will be understood that these are for the purpose of illustrating the principles of my invention only, and that many modifications and changes can be made in the detail construction of the invention by those skilled in the art without departing from the spirit or scope of the invention. Accordingly, I do not desire to be understood as limiting myself except as required by the following claims when construed in the light of the prior art.

Having thus described the invention, what I claim is:

A device of the character described including an eraser holding member, having an open end and provided with a projection on the interior walls thereof to engage the eraser, said projection having the side thereof adjacent said open end of said member arranged at a sharp angle to said interior walls of said member, the opposite side of said projection being inclined gradually inwardly of the clip toward the plane of said interior walls, whereby movement of the eraser into said holding member is prevented, while the eraser is free to move outwardly of said member, and means for clamping said eraser in said eraser holding member.

LOTHAR W. FABER.